(12) United States Patent
Fratelli et al.

(10) Patent No.: US 10,144,294 B2
(45) Date of Patent: Dec. 4, 2018

(54) AUXILIARY ENERGY MANAGEMENT SYSTEM AND METHOD FOR OPERATING AN AUXILIARY SYSTEM

(71) Applicant: HITACHI RAIL ITALY S.p.A., Naples (IT)

(72) Inventors: Luigi Fratelli, Naples (IT); Vincenzo Improta, Naples (IT)

(73) Assignee: HITACHI RAIL ITALY S.p.A., Naples (IT)

( * ) Notice: Subject to any disclaimer, the term of this patent is extended or adjusted under 35 U.S.C. 154(b) by 12 days.

(21) Appl. No.: 15/528,669

(22) PCT Filed: Nov. 27, 2015

(86) PCT No.: PCT/IB2015/059178
§ 371 (c)(1),
(2) Date: May 22, 2017

(87) PCT Pub. No.: WO2016/084043
PCT Pub. Date: Jun. 2, 2016

(65) Prior Publication Data
US 2017/0267105 A1    Sep. 21, 2017

(30) Foreign Application Priority Data

Nov. 28, 2014   (IT) .............................. TO2014A0984

(51) Int. Cl.
*B60L 11/12* (2006.01)
*B60L 7/12* (2006.01)
(Continued)

(52) U.S. Cl.
CPC ................... *B60L 7/12* (2013.01); *B60L 7/14* (2013.01); *B60L 7/16* (2013.01); *B60L 11/1801* (2013.01);
(Continued)

(58) Field of Classification Search
CPC .......... B60L 11/12; B60L 11/123; B60L 6/26; H02K 7/09; G05B 11/00; F16C 32/0457
(Continued)

(56) References Cited

U.S. PATENT DOCUMENTS

| 6,268,666 | B1 * | 7/2001 | Bhowmik | ............... H02J 7/345 |
| | | | | 307/72 |
| 7,672,149 | B2 * | 3/2010 | Falk | ........................ H02J 3/387 |
| | | | | 363/21.02 |

(Continued)

Primary Examiner — Rina Duda
(74) Attorney, Agent, or Firm — Leason Ellis LLP

(57) ABSTRACT

An auxiliary power supply system for an electric motor of an electric vehicle, comprising supercapacitors to generate a first auxiliary power supply, batteries to generate a second auxiliary power supply, one single common bidirectional converter and a control logic, which is configured for: (i) supplying power to the electric motor by means of network power supply voltage and through the energy stored in the supercapacitors during the acceleration of the electric vehicle; (ii) charging the supercapacitors during the braking of the electric vehicle, harvesting kinetic energy; (iii) supplying power to the electric motor through the sole energy of the batteries in the absence of the network power supply voltage; and (iv) charging the batteries during the running at constant speed and the parking of the electric vehicle.

14 Claims, 6 Drawing Sheets

(51) Int. Cl.
   *H02J 7/34* (2006.01)
   *B60L 7/14* (2006.01)
   *B60L 7/16* (2006.01)
   *B60L 11/18* (2006.01)
   *B60L 15/20* (2006.01)
   *H02P 3/14* (2006.01)

(52) U.S. Cl.
   CPC ............ *B60L 11/1809* (2013.01); *B60L 15/20* (2013.01); *B60L 15/2045* (2013.01); *H02J 7/345* (2013.01); *H02P 3/14* (2013.01); *Y02T 10/645* (2013.01); *Y02T 10/7005* (2013.01); *Y02T 10/7072* (2013.01); *Y02T 10/72* (2013.01); *Y02T 10/7283* (2013.01); *Y02T 10/90* (2013.01); *Y02T 90/14* (2013.01)

(58) Field of Classification Search
   USPC .................................. 318/139, 727, 800, 801
   See application file for complete search history.

(56) References Cited

U.S. PATENT DOCUMENTS

| | | |
|---|---|---|
| 8,027,760 B2 | 9/2011 | Chattot |
| 2005/0099829 A1* | 5/2005 | Wei ..................... H02M 5/4585 363/34 |
| 2007/0278059 A1 | 12/2007 | Afriat |
| 2012/0038294 A1* | 2/2012 | Schulz ................ F16C 32/0457 318/8 |

* cited by examiner

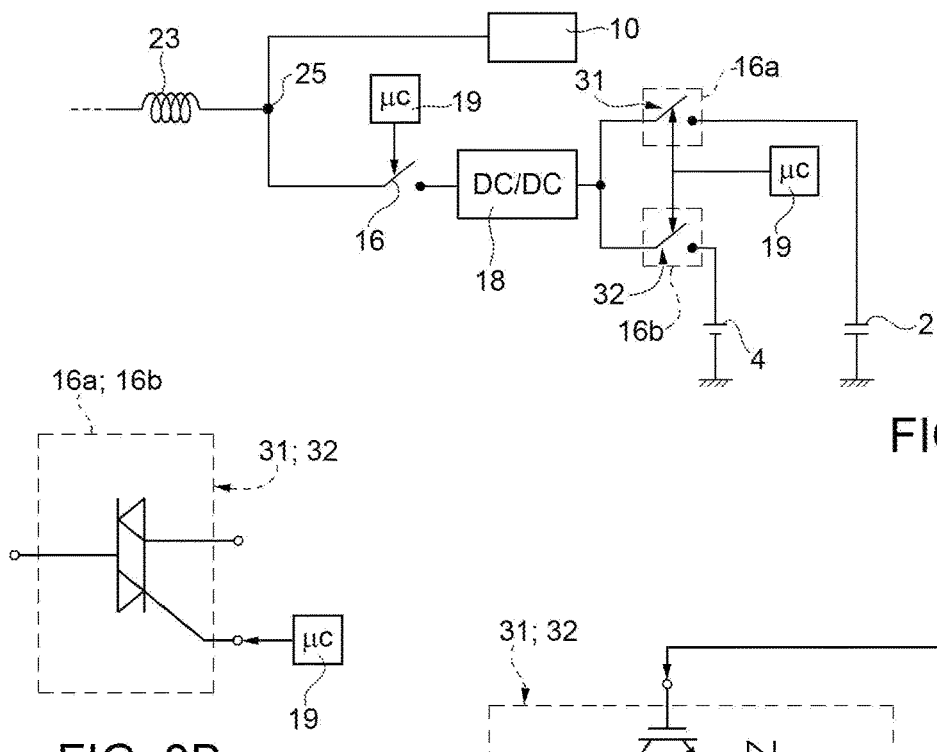
FIG. 3A
FIG. 3B
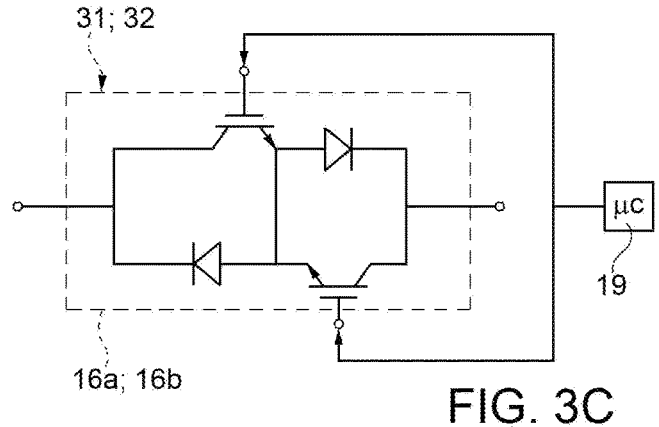
FIG. 3C
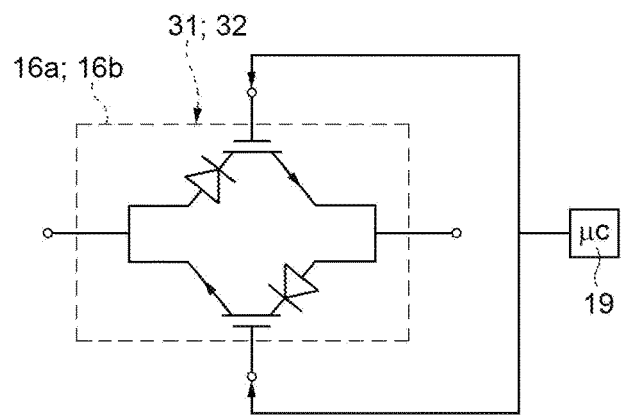
FIG. 3D

AUXILIARY ENERGY MANAGEMENT SYSTEM AND METHOD FOR OPERATING AN AUXILIARY SYSTEM

CROSS REFERENCE TO RELATED APPLICATIONS

The present application is a U.S. National Phase of International Patent Application PCT/IB2015/059178, filed on Nov. 27, 2015, which claims priority to Italian Application No. TO2014A000984, filed on Nov. 28, 2014, each of which is incorporated by reference as if expressly set forth in their respective entireties herein.

TECHNICAL FIELD

The present invention relates to an auxiliary system of power supply and energy harvesting for an electric vehicle and to a method for operating the auxiliary system of power supply and energy harvesting. In particular, said vehicle is an electric vehicle used for trains or trams with overhead wires, more in particular an electric vehicle running on tracks.

BACKGROUND ART

Rechargeable batteries ("stacks") are known, which are used to supply power to an electric load in case, for example, there is an unexpected interruption of the supply of power or, in general, for back-up applications. Furthermore, these batteries are charged by means of the energy released during the braking of the vehicle.

Document U.S. Pat. No. 6,265,851 describes a system to move a trolley for the transportation of electronic material on a monorail track. This power supply system comprises batteries and ultracapacitors, which are connected to a switch. The motor of the electric trolley is alternatively supplied with power by the ultracapacitors or by the batteries or by both, depending on the energy needed by the motor and by the residual energy that can be delivered by the ultracapacitors and the batteries. The ultracapacitors are the primary source of power and the batteries are used as auxiliary or secondary source of power. The batteries are used during acceleration steps and when a surplus of energy is needed.

The applicant found out that the exchange of energy enabled by ultracapacitors is characterized by high peak powers (around hundreds of kW, in the railway field) for relative short times (approximately 10 seconds). The system according to U.S. Pat. No. 6,265,851 cannot be used in the railway field for the purpose of supplying power to the vehicle while it is running, because the ultracapacitor runs down too quickly and with very high peak powers.

Document EP 2306610 relates to a system to generate, store and transmit energy in an area, wherein an electrical network comprises two different energy storage means, in particular batteries and supercapacitors. This electrical network extends over a given area in order to transport electrical energy and has nothing to do with transportation by means of trains or trams with overhead wires.

Document WO 2007/082168 describes a method and a system comprising one or more supercapacitors and one or more batteries. The supercapacitors are charged by means of energy coming from a generic source of energy and the electrical energy stored in them is used both to charge the batteries and to supply power to an electrical load. In this case, again, as already mentioned when discussing document EP 2306610, the system is used to store and transport energy in an area and it has nothing to do with the use of energy in a vehicle for trams with overhead wires.

DISCLOSURE OF INVENTION

The object of the present invention is to provide an auxiliary system of power supply and energy harvesting for an electric vehicle and a method for operating the auxiliary system of power supply and energy harvesting, which are able to overcome the problems of the prior art. According to the present invention there are provided an auxiliary system of power supply and energy harvesting for an electric vehicle and a method for operating the auxiliary system of power supply and energy harvesting, as respectively claimed in the appended claims.

BRIEF DESCRIPTION OF THE DRAWINGS

The present invention will be best understood upon perusal of the following detailed description of preferred embodiments, which are provided by way of example and are not limiting, with reference to the accompanying drawings, in which:

FIGS. 3A-3D show respective embodiments of a switch of the auxiliary circuit of power supply and energy harvesting of FIG. 1 and FIG. 2;

BEST MODE FOR CARRYING OUT THE INVENTION

According to the present invention there is provided a system for the supply of power and the harvesting of kinetic energy for an electric vehicle, in particular for a train or a tram with overhead wires, more in particular for a vehicle running on tracks, such as a railway vehicle. Therefore, hereinafter we will talk about an electric vehicle, a vehicle running on tracks or a tram with overhead wires, without because of this loosing in generality. The system according to the present invention fulfils the following functions: increase of the energetic efficiency by means of on-board harvesting of braking energy and re-use in the following acceleration step; containment of power peaks in the catenary, namely increase of the peak performances of the railway vehicle given the same catenary peak power; ability to run over significantly long routes in the absence of catenary, namely with the catenary not supplied with power.

The system according to the present invention fulfils the above-mentioned functions by storing the energy in and harvesting it from stacks of batteries and arrays of supercapacitors, in distinct time intervals and using a common energy exchange circuit. The use of mixed storage systems allows users to simultaneously enjoy the performances of the supercapacitors in exchanging high powers, which is essential for fulfilling the functions of increasing of the energetic efficiency and containing power peaks in the catenary, and the energy storage capacity of the batteries, which is used to fulfil the function of autonomously running over significantly long routes in the absence of supply of power from the electric railway line.

In other words, the supercapacitors are used for the majority of the charging/discharging cycles, as they have a limited capacity but they offer a long-lasting working life in terms of charging/discharging cycles, and the use of batteries is limited to the sole necessary cases, as their duration in terms of charging/discharging cycles is limited.

Figure 1:
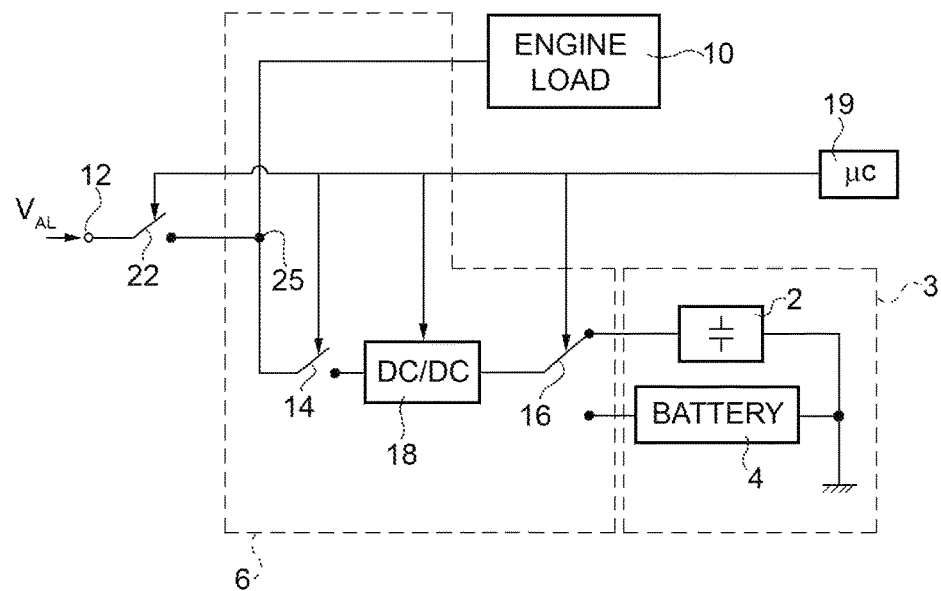
FIG. 1 shows an auxiliary circuit of power supply and energy harvesting for an electric vehicle, according to an embodiment of the present invention.

FIG. 1 schematically shows a power supply system 1 for an electric vehicle (in particular a vehicle running on tracks or a tram with overhead wires) according to an aspect of the present invention. The power supply system 1 comprises: an auxiliary power supply assembly 3 comprising an array of supercapacitors 2 and a stack of batteries 4 (e.g. lithium-ion batteries), and an energy exchange circuit 6, which is shared by the array of supercapacitors 2 and the stack of batteries 4. The array of supercapacitors 2 and the stack of batteries 4 are configured to supply respective electrical quantities (voltages/currents) of the direct type and having respective values in Volts (e.g. the stack of batteries provides a voltage of approximately 500 V, whereas the array of supercapacitors 2 supplies a voltage that can range from 55 to 250 V, depending on the level of charge of the array of supercapacitors 2).

The energy exchange circuit 6 comprises:

a main power supply switch 22, which is configured to electrically couple/uncouple the energy exchange circuit 6 to/from a primary power supply line 12 (which supplies a power supply voltage $V_{AL}$, in particular a direct voltage having a value, for example, of 750 V);

a transfer switch 14, which is configured to electrically couple/uncouple (together with the main power supply switch 22) the array of supercapacitors 2 and the stack of batteries 4 to/from the primary power supply line 12 and to electrically couple/uncouple the electrical load 10 to/from the array of supercapacitors 2 and the stack of batteries 4.

The main power supply switch 22 fulfils the function of electrically coupling and uncoupling the primary power supply line 12 to and from the power supply system 1 during the respective operating steps of the power supply system 1. For examples, the situation in which the primary power supply line 12 must be electrically uncoupled from the electrical load 10 and from the auxiliary power supply assembly 3 comprise the passage of sections of non-supplied line (neutral sections).

Evidently, according to alternative embodiments, the main power supply switch 22 and/or the transfer switch 12 can be omitted. The energy exchange circuit 6 comprises, furthermore, a switch 16, which is configured to operatively couple the transfer switch 14 to the stack of batteries 4 or to the array of supercapacitors 2, alternatively. The switch 16 can be made by means of electromechanical devices or with a semiconductor.

In particular, a bidirectional DC-DC converter 18 is electrically interposed between the transfer switch 14 and the selection switch 16.

In the specific case in which the primary power supply line 12 operates at a voltage that is higher than the voltage at which the stack of batteries 4 and/or the array of supercapacitors 2 operate, the DC-DC converter 18 is configured to operate as a buck converter to supply electrical energy from the primary power supply line 12 towards the stack of batteries 4 or towards the array of supercapacitors 2, and as a boost converter to supply electrical energy from the stack of batteries 4 or from the array of supercapacitors 2 towards the electrical load 10.

Evidently, in case the primary power supply line 12 operates at a voltage that is smaller than the voltage at which the stack of batteries 4 and/or the array of supercapacitors 2 operate, the DC-DC converter 18 operates inversely to what described above.

Furthermore, the DC-DC converter 18 also operates during those steps in which the electrical load 10 is supplied with power by the stack of batteries 4 or, alternatively, by the array of supercapacitors 2, so as to transfer energy from the stack of batteries 4 or, alternatively, from the array of supercapacitors 2 towards the electrical load 10, as we will explain more in detail below.

In general, the DC-DC converter 18 carries out an energetic adaptation to transfer energy from the primary power supply line 12 towards the stack of batteries 4 and/or the array of supercapacitors 2 and to transfer energy from the stack of batteries 4 or from the array of supercapacitors 2 towards the electrical load 10.

The transfer switch 14 has a terminal that is electrically coupled to an intermediate node 25, which receives a supply of power from the primary power supply line 12 when the power supply switch 22 is closed.

To this regard, the electrical load 10 comprises at least one inverter and one electric motor of the vehicle, and it is adapted to generate a torque for the vehicle itself. The primary power supply line 12 is any line suited to supply electrical power to a generic electric vehicle, it is arranged on the outside of the electric vehicle and it is part of an infrastructure for the supply of electrical power, in particular for trains or trams with overhead wires.

The number of accumulator cells of the stack of batteries 4 and the number of supercapacitors making up the array of supercapacitors 2 are chosen according to the following criteria: quantity of energy to be stored and released during every charging/discharging cycle, maximum power to be absorbed/delivered, performances to be obtained in terms of working life of the supercapacitors and the batteries.

Supercapacitors are devices for converting and storing energy, characterized by a high specific capacity, and they can store an amount of energy by volume unit that is remarkably greater compared to conventional capacitors. Supercapacitors are well documented in the scientific literature and on the market they are available in different sizes of capacity—from some Farads to some thousands of Farads—usually manufactured by connecting in parallel "strings" of elementary cells arranged in series relative to one another, each with a working voltage of some Volts, in any case depending on the manufacturing technique. Some manufacturers supply the capacitors in packagings with one single capacitor, or in modules consisting of different supercapacitors with connections in series and/or in parallel.

According to an aspect of the present invention, the array of supercapacitors 2 forms a first additional power supply unit, which fulfils the function of supporting the primary power supply line 12 in supplying power to the electrical load 10 (electric motor) during predetermined operating steps of the electric vehicle, in particular during acceleration steps of the electric vehicle.

According to a further aspect of the present invention, the stack of batteries 4 forms a second additional power supply unit, which fulfils the function of replacing the primary power supply line 12 in supplying power to the electrical load 10 (electric motor) during predetermined operating steps of the electric vehicle, in particular when the primary power supply line 12 does not provide current for supplying power to the electrical load (for example, due to a general fault of the primary power supply line 12, which causes the interruption of the electrical power supply thereof), or in sections where, due to environmental or city-planning reasons, the primary power supply line 12 is not available.

The switch 16 can be made as shown in FIG. 3A, for example by means of a first and a second bidirectional electronic switches 31, 32, which are both kept open or operated with a complementary logic (one closed and the other one open). The first bidirectional electronic switch is coupled between the inductor 62 and the array of supercapacitors 2, whereas the second one is coupled between the inductor 62 and the stack of batteries 4. During their operation, the two bidirectional electronic switches 31, 32 are controlled with a complementary logic: when the first switch 31 is controlled so as to be turned on, by electrically connecting the DC-DC converter 18 to the array of supercapacitors 2 (and, therefore, by connecting the latter to the intermediate node 25), the second switch 32 is kept open and vice versa. Hence, the first and the second switches 31, 32 are never both controlled so as to be in an ON state. The bidirectional electronic switches 31, 32 can be each implemented: by means of a TRIAC (FIG. 3), or by means of a pair of reverse conducting MOSFET/IGBT, which are coupled in series to one another with the respective emitters in common (FIG. 3C), or by means of two reverse blocking IGBT, which are coupled in antiparallel (FIG. 3D).

When not is use (for example when the electric motor 32 is off), both the first and second electronic switches 31, 32 can be controlled so as to be in an OFF state.

The switch 14 and the switch 16 can be controlled so as to close, in their respective operating conditions, by a generic controller or microcontroller 19, which is built-in in specific components of the auxiliary power supply system 1 or is external to the auxiliary power supply system 1.

If it is on the outside of the power supply system 1, the microcontroller 19 can be, for example, built-in in a control/monitoring system (not shown in FIG. 1) of the electric vehicle, and it can be configured to detect an event that requires power to be supplied to the electric motor of the vehicle by means of the array of supercapacitors 2 or by means of the stack of batteries 4. The microcontroller 19 is further configured to detect steps in which the array of supercapacitors 2 or the stack of batteries 4 can be charged, according to the steps that are described more in detail with reference to FIG. 5.

Alternatively, the functions described with reference to the microcontroller 19 can be fulfilled in a distributed manner by control and management systems belonging to the inverter 30 and the DC-DC converter 18.

The microcontroller 19 (or, alternatively, the control and management systems of the inverter 30 and of the DC-DC converter 18) carries out the task described above by acquiring information on the state of power supply of the line 12 and on the state of charge of the batteries 4 and of the supercapacitors 2 by means of current/voltage sensors, which are properly arranged in the area of the line 12, at the output of the DC-DC converter 18 and at the output of the stacks of batteries 4 and of the supercapacitors 2, so as to detect the respective levels of voltage/current and, thus, assess whether there is a need/chance to charge the batteries 4 and/or the supercapacitors 2 or a need to supply power to the electric motor 32 by means of the batteries 4 (in case of absence of the main power supply $V_{AL}$).

Then, the microcontroller 19 sends a respective control signal to the switch 14 and to the switch 16 in order to:

connect the array of supercapacitors 2 to the electrical load 10, so as to supply power to the electrical load 10;

or connect the stack of batteries 4 to the electrical load 10, so as to supply power to the electrical load 10;

or connect the stack of batteries 4 to the source of network power supply 12, so as to charge the stack of batteries 4;

or connect the array of supercapacitors 2 to the electrical load 10, so as to charge the array of supercapacitors 2 through the electric motor 32, which is used as a current generator, by means of the DC-DC converter 18, in particular during the braking steps of the electric vehicle; as a matter of fact, the kinetic energy of the electric vehicle in the braking step can be turned into electrical energy in a known manner, and said electrical energy can be stored in the supercapacitors and re-used in a following operating step of the electric vehicle.

The switch 14 and the switch 16 can be electromechanical devices or they can be manufactured through combinations of electronic devices (e.g. diodes, transistors, MOSFET, TRIAC, IGBT, etc.).

The power supply system 1 of FIG. 1 comprises, furthermore, as already mentioned above, the DC-DC converter 18, which is a bidirectional DC-DC converter and operates by boosting or bucking the voltage present at its input. For example, it can be a buck/boost converter and it is controlled, in its operation, by the microcontroller 19 in a known manner, so as to carry out the voltage boosting steps or the voltage bucking steps, based on the needs.

The DC-DC converter 18 turns out to be useful because the voltage levels of the load 10 and of the different power supply sources available (namely, the line 12, the batteries 4 and the supercapacitors 2) are different from one another and, in the case of the supercapacitors, extremely variable during the charging/discharging steps.

To sum up, the DC-DC capacitor 18 fulfils the function of allowing the stack of batteries 4 and the array of supercapacitors 2 to deliver the power requested by the electrical load 10, operating at the same time in optimal conditions for the electrical load 10 in terms of voltage and current values generated. Furthermore, the DC-DC converter 18 operates by adjusting the charging voltage of the stack of batteries 4 and of the array of supercapacitors 2, so as to keep, at the output, a constant value, regardless of the voltage present on the main power supply line 12. The DC-DC converter 18 can further fulfil the function of measuring the current and/or voltage delivered by the stack of batteries 4 and by the array of supercapacitors 2. The resulting measure can be sent to the microcontroller 19 and be processed so as to check the operating conditions of the stack of batteries 4 and of the array of supercapacitors 2.

Figure 2:
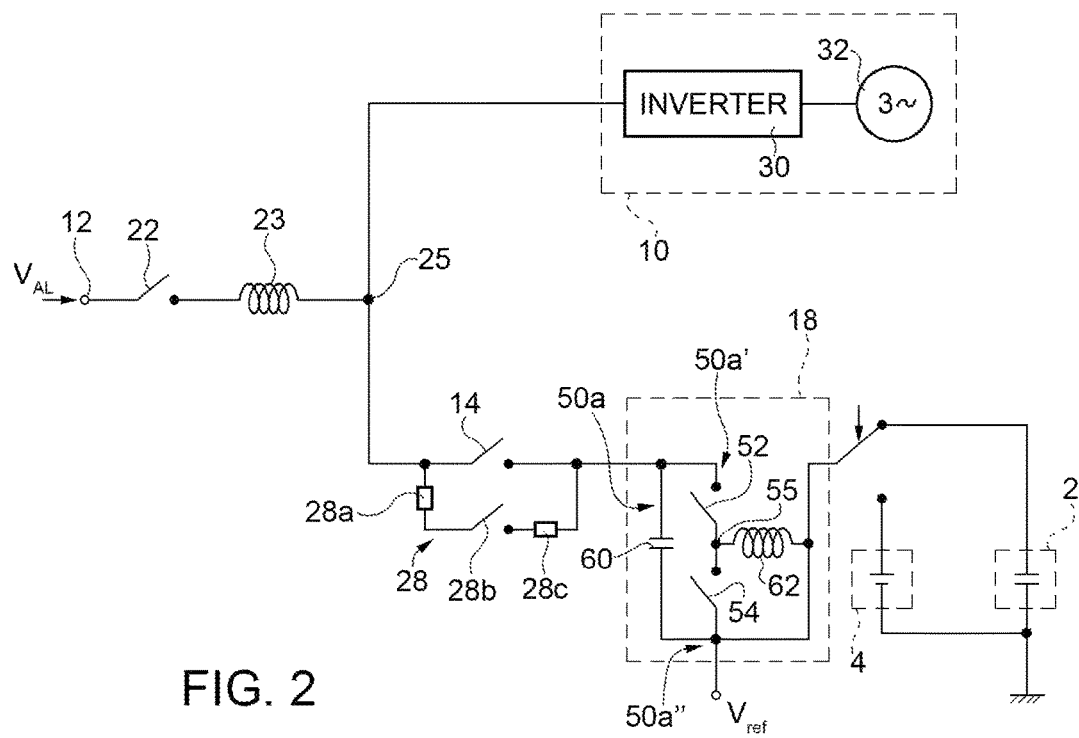
FIG. 2 shows, more in detail, the auxiliary circuit of power supply and energy harvesting of FIG. 1.

FIG. 2 shows the power supply system 1 more in detail, according to an aspect of the present invention. The elements of the power supply system 1 that were already described above with reference to FIG. 1 are indicated with the same reference numbers and are not described any further.

With reference to FIG. 2, the power supply system 1 comprises, furthermore, a filter, which is configured to attenuate the current harmonics absorbed by the power supply line 12. This filter is, in particular, an LC filter. According to an embodiment, a portion of the filter, in particular an inductor 23 (which makes up the inductive component "L" of the LC filter), is arranged between a terminal of the main power supply switch 22 and the intermediate node 25 of the power supply system 1. The capacitive component "C" of the LC filter is made up of the capacitive components present in the DC-DC converter 18 (see, for example, the capacitor 60 of FIG. 2) or of the capacitive components present in the traction converter controlling the electric motor (see the traction converter 30 of FIG. 2). In this way, in use, the LC filter acts both upon the branch including the electrical load 10 and upon the branch including the auxiliary power supply assembly 3. The LC filter is optional and it can be omitted or manufactured differently from what described above.

The electrical load 10 comprises, in the embodiment considered herein, at least one known traction converter 30, which acts as an interface between the main power supply line 12 and the electric motor 32 to be supplied with power. The traction converter 30 and the motor 32 form a drive chain.

A pre-charging circuit 28 is electrically coupled in parallel to the transfer switch 14 and comprises a protection device 28a (e.g. a fuse), a contactor 28b, which is connected in series to the protection device 28a, and a resistor 28c, which is connected in series to the contactor 28b. The protection device 28a is adapted to protect the resistor 28c in case of a short circuit downstream of the resistor 28c in the amount of time in which the contactor 28b is closed, whereas the resistor 28c is adapted to dampen possible oscillations of the voltage/current supplied to the DC-DC converter 18. The contactor 28b is turned on during the initial steps of the supply of power to the DC-DC converter 18, with the transfer switch 14 turned off. During this step, capacitive elements of the DC-DC converter 18 are charged by means of the power supply voltage $V_{AL}$, through the protection device 28a and the resistor 28c. A the end of the pre-charging step (which can last some fractions of second), the contactor 28b is turned off and the transfer switch 14 is turned on.

The DC-DC converter 18 is shown in FIG. 2 in a schematic manner, by mere way of example, according to one of embodiments called "buck-boost converter". The DC-DC converter 18 of FIG. 2 comprises a first and a second terminal 50a', 50a" (the latter connected to a reference voltage Vref, e.g. a ground reference or a negative reference voltage). The first terminal 50a' is connected to a first switch 52, whereas the second terminal 50a" is connected to a second switch 54. Therefore, the first switch 52 and the second switch 54 are connected to one another in the area of an electrical node 55.

Furthermore, between the first and the second terminal 50b', 50b", in parallel to the series formed by the first and the second switch 52, 54, there is interposed an accumulator element 60 (typically, a capacitor or an array of capacitors).

Finally, the electrical node 55 is connected to an inductor 62.

The first and the second switch 52, 54 are, for example, reverse conducting IGBT devices, i.e. IGBT provided with a respective diode collected in an antiparallel configuration.

In use, the bidirectional DC-DC converter is used both during the steps in which the auxiliary power supply assembly 3 supplies power to the electrical load 10 and during the steps in which the array of supercapacitors 2 or, alternatively, the stack of batteries are charged. Evidently, the power supply system 1 can comprise any other known type of bidirectional DC-DC converter different from the type shown in FIG. 2.

Furthermore, two one-way DC-DC converters can be used, for example a boost converter and a buck converter or two buck-boost converters connected between the transfer switch 14 and the auxiliary power supply unit 3.

Figure 4:
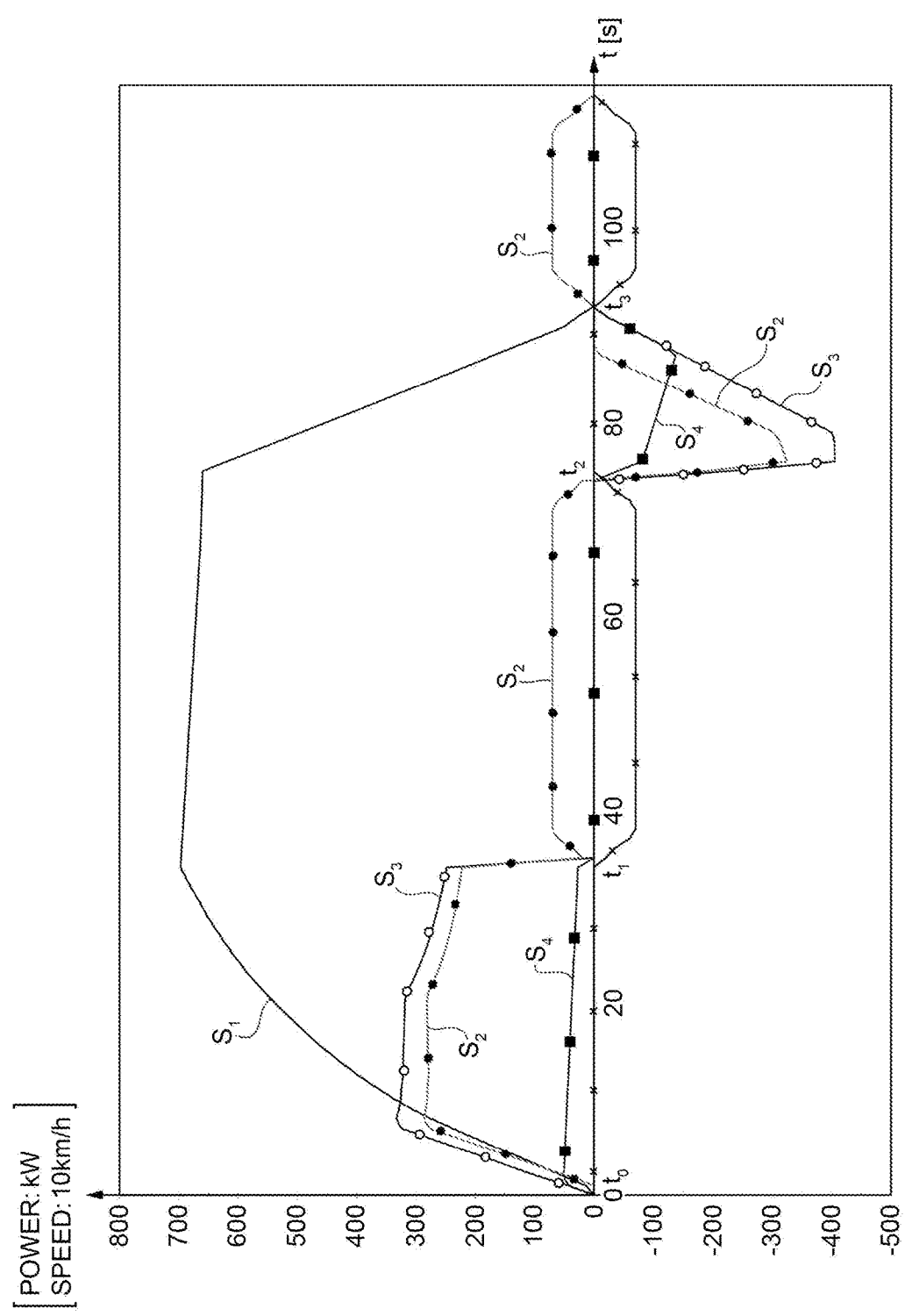
FIG. 4 shows wave forms of electrical power quantities, which show the operation of the auxiliary circuit of power supply and energy harvesting of FIG. 1 in relation to operating conditions of the electric vehicle, according to an aspect of the present invention.

With reference to FIG. 4, now we will describe an example of the way in which the power supply system 1 of FIGS. 1 and 2 works.

In FIG. 4, the axis "t" of the x-coordinates is a time axis, which shows the development in time of signals identifying the functions fulfilled by the power supply system 1. To this aim, the axis of the y-coordinates shows, expressed in kW, the powers exchanged between the different elements making up the power supply system 1. The figure also shows, overlapping these power curves, a curve representing the development of the speed (in km/h) of an electric vehicle, so as to show the development of the power curves in relation to different operating steps of the electric vehicle.

The curve S1 shows the speed of the electric vehicle, in km/h, multiplied by 10 to ensure a displaying uniformity. In the time instant $t_0$, the electric vehicle is assumed to be in parking and its speed is equal to zero. Between the time instant $t_0$ and the time instant $t_1$ the electric vehicle accelerates, thus reaching a maximum speed of 70 km/h in the time instant $t_1$.

The curve S2 shows the power delivered by the main power supply line between the time instant $t_0$ and the time instant $t_1$, namely during the acceleration step of the electric vehicle. The curve S3 shows the power absorbed by the motor 32 of the electric vehicle.

As you can see, the power delivered by the main power supply line 12 (curve S2) increases up to a maximum value, in order to then settle and progressively decrease its value as a function of the power needed and absorbed by the motor 32. In particular, the motor 32 progressively decreases 32 the request for power when it reaches time instants that are close to the time instant $t_1$.

As you can see in FIG. 4, the curve S2 closely follows the curve S3: however, the curve S3 always keeps values of kW absorbed by the motor that are greater than respective values of kW provided by the main power supply line 12. As a wetter of fact, according to the present invention, during the acceleration step of the electric vehicle, the energy stored by the array of supercapacitors 2 is transferred to the motor 32 between the time instant $t_0$ and the time instant $t_1$, so as to supply an additional power (curve S4) to the motor 32 of the electric vehicle during the step in which the request for energy and the consumption thereof are the greatest. Therefore, as a result, the power absorbed by the motor 32 is greater than the power that can be drawn from the main power supply line 12, in particular greater by a quantity that is equal to the quantity provided by the array of supercapacitors 2.

With joint reference to FIGS. 2 and 3, during the operating step taking place between the time instant $t_0$ and the time instant $t_1$, the power supply switch 22 is closed. During this step, the selection switch 16 is controlled so as to electrically couple the array of supercapacitors 2 to the DC-DC converter 18 and so as to electrically uncouple the stack of batteries 4 from the DC-DC converter 18. The transfer switch 14 is controlled so as to be in an ON state and the DC-DC converter 18 typically operates in a "boost" mode, so as to boost the voltage level of the array of capacitors, thus transferring the energy stored in the array of supercapacitors 2 to the electrical load 10.

In the time instant $t_1$ the electric vehicle ends the acceleration step. Therefore, no more power needs to be supplied to the motor by means of the array of supercapacitors 2, which, in the meantime, have run down and have reached their minimum voltage value. After the acceleration step has ended, a running step (time interval between the time instant $t_1$ and the time instant $t_2$) at a substantially constant speed (called "coasting") begins, during which the motor is not supplied with power by the main power supply line 12. The electric vehicle, during this step, runs due to inertia. The power supplied by the main power supply line 12, as it not used to supply power to the motor, can be used, during this time interval $t_1$-$t_2$, to charge the stack of batteries 4. To this aim, in the time instant $t_1$, the selection switch 16 uncouples the array of supercapacitors 2 from the DC-DC converter 18 and couples the stack of batteries 4 to the DC-DC converter 18. The switch 22 is turned on and the transfer switch 14 is turned on, as well. A charging current flows from the main power supply line 12, through the DC-DC converter 18, towards the stack of batteries 4. The DC-DC converter 18 typically operates in a "buck" configuration.

In the time instant $t_2$, the electric vehicle begins a braking step. During this step, the motor 32 works as an energy generator. In the time instant $t_2$, the selection switch 16 switches so as to electrically couple the array of supercapacitors 2 to the DC-DC converter 18 and so as to electrically uncouple the stack of batteries 4 from the DC-DC converter 18.

The main power supply switch 22 and the transfer switch 14 are turned on. Th DC-DC converter 18 operates in "buck" mode and receives the energy provided by the motor 32 operating as a current generator, thus transferring it towards the array of supercapacitors 2, which by so doing is charged.

As a matter of fact the curve S4 has, between $t_2$ and $t_3$, a negative value (namely, the supercapacitors 2 receive power and store energy). In the same time interval, the curve S3 is negative, namely the motor generates power instead of absorbing it. Not all the energy provided by the motor is necessarily stored by the array of supercapacitors 2. In case the energy provided by the motor exceeds the capacity of the array of supercapacitors 2, the energy that is not stored therefrom can be introduced into the primary power supply line 12, if the latter is receptive, namely said energy is turned into heat by means of a suitable braking rheostat, which is inserted by means of a suitable chopper. This is shown in FIG. 4 through the curve S2, which, between $t_2$ and $t_3$, has a negative value (namely, the main power supply line 12 absorbs power).

In the time instant $t_3$, the electric vehicle has ended the braking step and it has stopped (e.g. in a train station). During this step, the charging of the stack of batteries 4 can be completed. To this aim, when a parking step is detected, the selection switch 16 electrically couples the stack of batteries 4 to the DC-DC converter 18 and, keeping the transfer switch 14 open, it supplies electrical energy from the main power supply line 12 to the stack of batteries 4 (the DC-DC converter 18 typically operates in "buck" mode).

According to an aspect of the present invention, the passage from one step to the following one, according to what described with reference to FIG. 4, is controlled by the control/monitoring system of the entire electric vehicle (e.g., in case of a railway vehicle, the TCMS-"Train Control and Monitoring System"), namely by a traction control unit (TCU-"Traction Control Unit"), which controls the single traction and energy storage chain. An on-board control system of this type typically includes a processing system, which is provided with at least one controller or microcontroller (e.g. the microcontroller 19). The operating steps of FIG. 4 can be described, for example, as the steps of a state machine, like the one shown in FIG. 5, implemented by the microcontroller 19.

Figure 5:
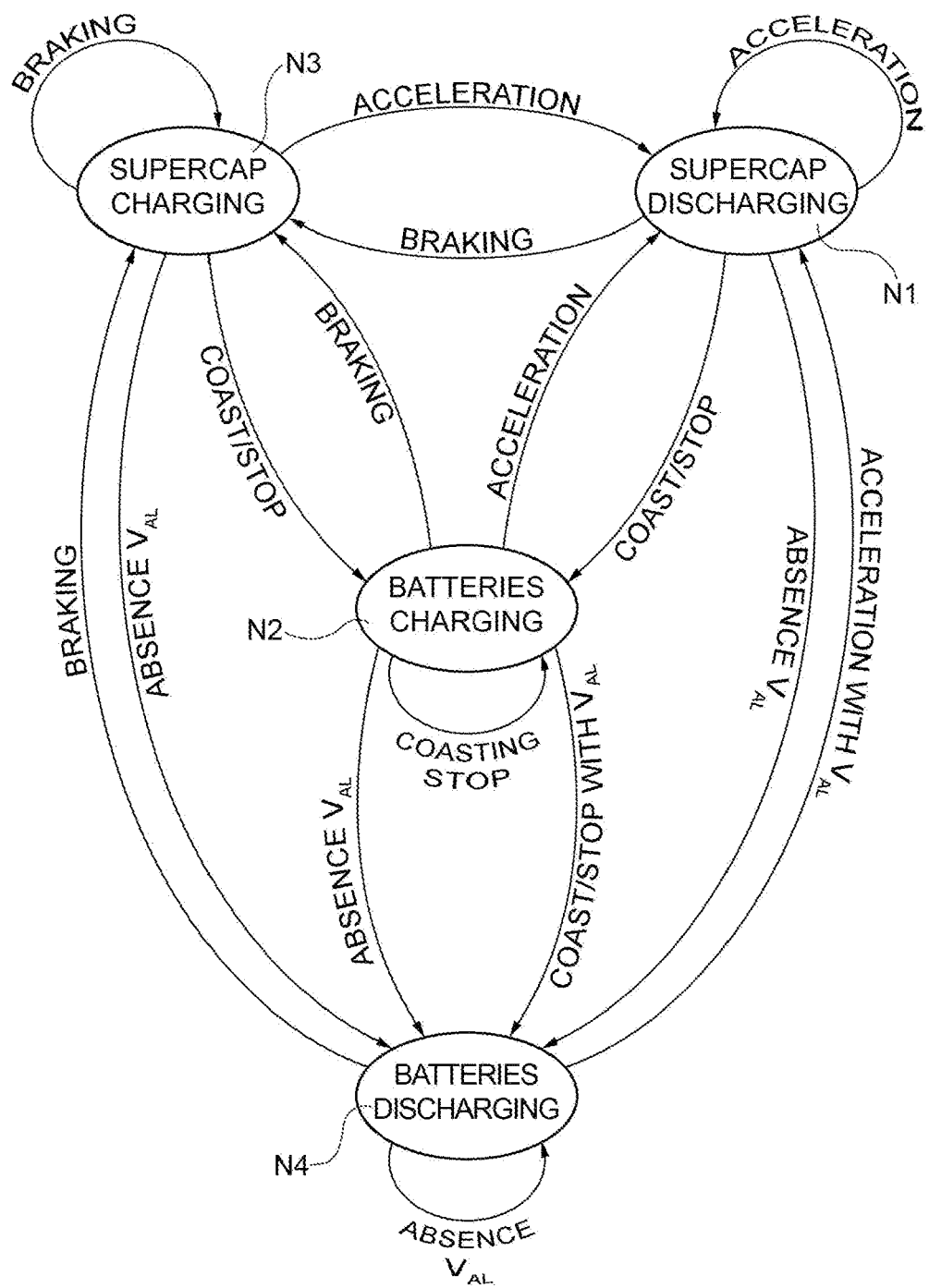
FIG. 5 shows, through a state diagram, a method to control the auxiliary circuit of power supply and energy harvesting of FIG. 1, according to an aspect of the present invention.

With reference to FIG. 5, the node N1 represents the condition in which the array of supercapacitors 2 is discharged in order to provide an auxiliary power supply to the motor 32, during the acceleration step of the electric vehicle. As long as the electric vehicle remains in the acceleration condition (and, obviously, as long as the array of supercapacitors is still charged enough to be able to supply energy), the on-board control system remains in the condition of the node N1.

The node N2 represents the charging condition of the stack of batteries 4. This condition occurs, as already mentioned above, when the electric vehicle is parked or when it is in a constant-speed running step (not supplied or minimally supplied by the power supply voltage $V_{AL}$). As long as the electric vehicle remains in this condition, the stack of batteries 4 is charged by means of energy taken from the main power supply line 12. In case the electric vehicle is controlled so as accelerate, we go back to the step of the node N1.

The node N3 represents a state in which the array of supercapacitors 2 is charged. The progress from the node N1 or the node N2 to the node N3 occurs in the presence of braking, namely when the motor 32 operates as an electrical energy generator. As long as the control system of the electric vehicle remains in the state of energy generation through braking, we remain in the state of the node N3. In the presence of acceleration, there is a passage from the node N3 to the node N1; otherwise, in the presence of parking of the electric vehicle or of non-supplied running, there is a passage to the node N2.

The stack of batteries 4 is used to supply power to the electric vehicle in specific cases, such as for example a general fault of the main power supply line 12 or in conditions in which the stack of batteries 4 is the only source of power of the electric vehicle. In these cases, the energy provided by the stack of batteries is used to move the electric vehicle to a safe position, for example to get out of a tunnel or to reach a nearby train station or a town. To this aim, as soon as the system detects the absence of the primary power supply voltage $V_{AL}$ and if the electric motor 32 needs to be supplied with power to allow the electric vehicle to run, there is a passage from the nodes N1, N2 and N3 to the node N4, in which the stack of batteries 4 is discharged by supplying power to the electric motor 32. During a braking step, regardless of the presence or absence of the power supply voltage $V_{AL}$, we go back to the node N3; otherwise we remain in the condition of the node N3. When the power supply voltage $V_{AL}$ returns, there can be a passage from the node N4 to the nodes N1, N2 and N3, depending on the needs.

Figure 6:
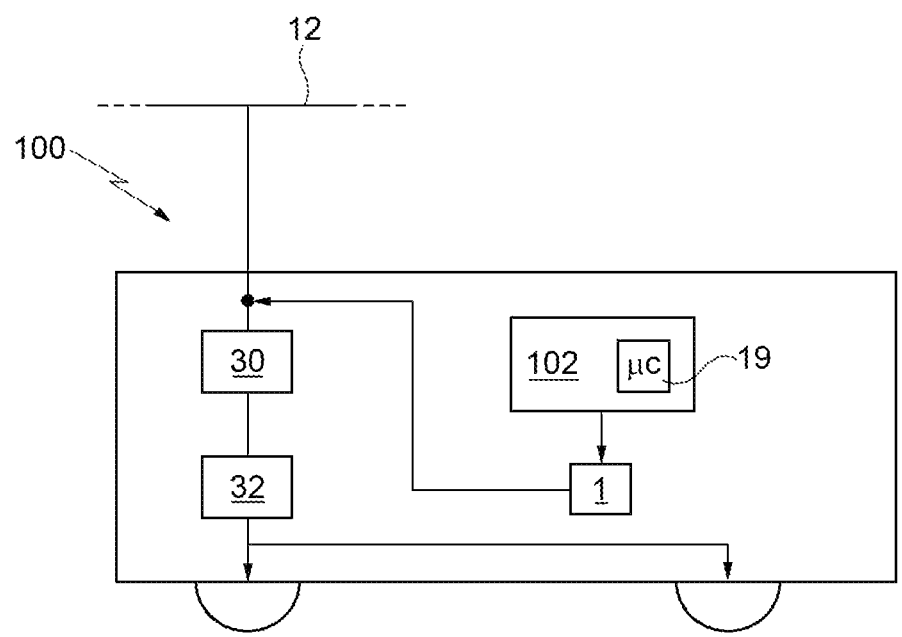
FIG. 6 shows, in a schematic manner, an electric vehicle comprising the auxiliary circuit of power supply and energy harvesting of FIG. 1 or FIG. 2.

FIG. 6 schematically shows an electric vehicle 100 comprising:

an electric motor 32, which is electrically coupled to the main power supply line 12, in particular through a traction converter 30, and operatively coupled to the traction system of the electric vehicle 100, so as to control its acceleration, its running at a constant speed and its braking;

a control system 102 comprising the microcontroller 19, which is configured to implement the steps of FIG. 5; and the power supply system 1 of FIG. 1 or FIG. 2, according to the respective embodiments described above.

The electric vehicle is chosen in the group consisting of: a train, a tram, a trolleybus or another electric vehicle supplied with power by a generic external power supply network.

From an analysis of the features described above and shown in the accompanying drawings, one can clearly understand the advantages that the present invention aims to achieve. In particular, thanks to the present invention (i) the energetic efficiency of the vehicle can be increased by harvesting on board the kinetic energy of the vehicle during the braking step, thus turning it into electrical energy stored in the supercapacitors and re-using it in the following acceleration step; this allows manufacturers to reduce energy consumptions, with remarkable advantages for train operators in terms of costs and eco-sustainability;

(ii) power peaks and effective current in the main power supply line can be limited, namely the peak performances of the railway vehicle can be increased, given the same peak power of the main power supply line; this allows manufacturers to increase the performances of the fleet of railway vehicles (i.e. increase the number of vehicles on the line, namely the performances thereof in terms of acceleration) without investing in the infrastructure, especially without the need to further develop or increase the number of power supply sub-stations;

(iii) the electric vehicle can cover routes with a significant length without main power supply. This makes the vehicle more versatile and allows it to be used in routes including places with historical and architectonic value that are not compatible with the presence of the main power supply line; storehouses or repair shops where there is not a main power supply line; sections of the main power supply line that are not supplied with power because of maintenance works to be carried out on the infrastructure; emergency running, for example in case of power supply failure in the main power supply line, to allow the vehicle to get out of a tunnel and reach a station, so as to let passengers out in safety; frozen sub-sections of the main power supply line.

The array of supercapacitors can be sized so as to be able to store the energy harvested in one single braking of the electric vehicle. This energy is kept in the supercapacitors as long as the electric vehicle is parked and it is immediately delivered during the acceleration step, thus bringing the supercapacitor back to the initial "discharged" state, in which it is ready to store the energy of the following braking step. This energy exchange is characterized by relevant peak powers (approximately hundreds of kW, depending on the electric vehicle) for fairly short times (approximately 10 seconds) and, therefore, it has a moderate energy. As a consequence, supercapacitors are components that turn out to be particularly convenient, thanks to their ability of absorbing/delivering relevant peak powers with components with a moderate weight.

The stack of batteries, on the other hand, is sized so as to store the large amount of energy needed to move the vehicle in the absence of power supply in the main power supply line. Since this running mode takes place at a small speed, the charging powers needed are limited. On the other hand, the batteries can be charged in relatively short times, exploiting all the "coasting" (running at a constant speed) and parking steps of the electric vehicle, which take place, for example, between two battery running steps. Since the batteries are not used to carry out energy harvesting during the normal acceleration and braking cycles, the limited specific power that can be delivered by the batteries does not constitute a significant sizing limit and their specific energy can be exploited in full. In the same way, the number of charging and discharging cycles undergone by the batteries is much smaller than one to which the supercapacitors are subjected and it is compatible with the limited number allowed during their working life.

Unlike the batteries of low-voltage on-board services, which are typically present in railway vehicles, the lithium batteries used according to an embodiment of the present invention are connected to the traction circuit (i.e. to the electric motor 32) and, therefore, they do not need a charger that operates ensuring galvanic isolation. Therefore, the electronic power circuit used for the energy exchange with the supercapacitors (i.e. the DC-DC converter 18 and the switch 16) is also used to charge/get power from the batteries, as it is able to implement the charging/discharging curves of the lithium batteries, also depending on the temperature. In particular, the inductor 62, which is a component of the converter that takes up a lot of space, is heavy and expensive, is unique and operates both in the supercapacitor charging/discharging mode and in the battery charging/discharging mode.

Finally, it is clear that the features described above with reference to the accompanying drawings can be subjected to changes and variations, without for this reason going beyond the scope of protection of the present invention, as set forth in the appended claims.

For example, in case the voltage levels generated by the stack of batteries and/or by the supercapacitors 2 are such that the electrical load 10 is directly supplied with power, the DC-DC converter 18 is a one-way converter, which is adapted to operate a conversion of the network voltage $V_{AL}$ and of the voltage generated by the load 10 in order to charge the stack of batteries/the supercapacitors 2 (or vice versa). Furthermore, in case even the network voltage $V_{AL}$ and the voltage generated by the load 10 do not need a DC-DC conversion to charge the stack of batteries/the supercapacitors 2, the DC-DC converter can be left out.

In particular, the stack of batteries 4 can comprise batteries of any available technology, e.g. lithium, lead, NiCd, NiMH, ZEBRA or others. Similarly, the array of supercapacitors can be replaced by ultracapacitors.

Figure 7:
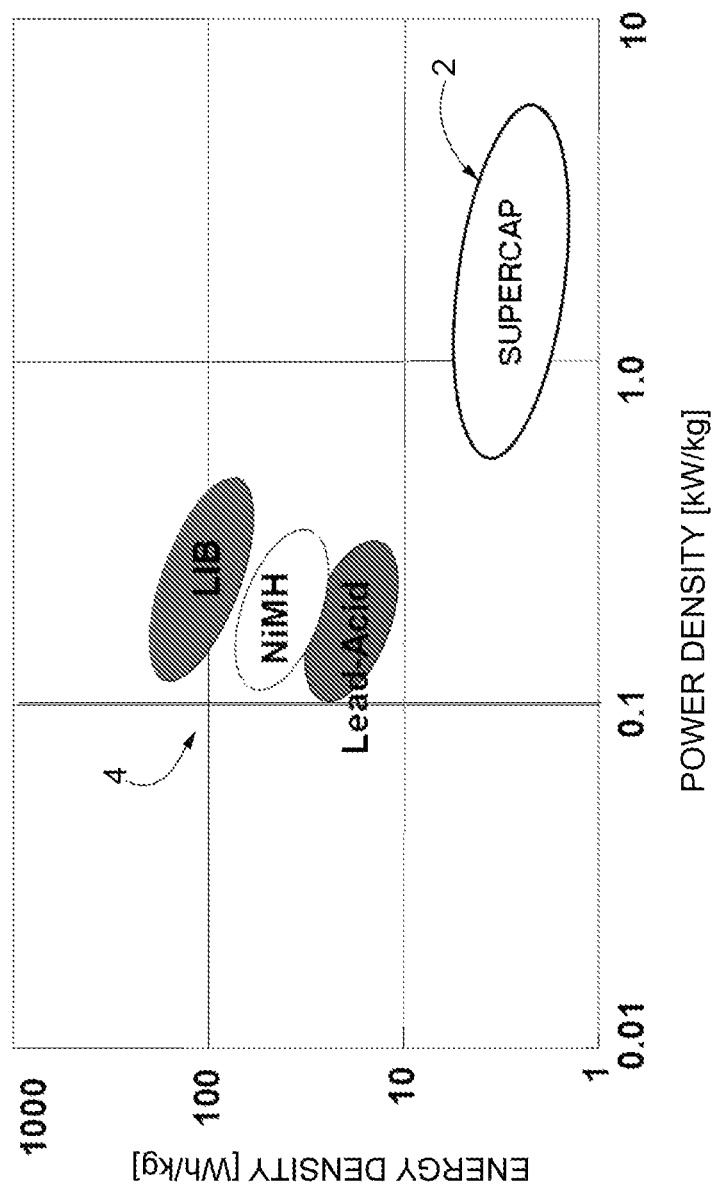
FIG. 7 shows a diagram of the performances, in terms of power density/energy density of known supercapacitors and known batteries.

In general, the auxiliary power supply assembly 3 comprises a first accumulator module (corresponding to the array of supercapacitors 2 described above) and a second accumulator module (corresponding to the stack of batteries 4 described above). The voltage value of each one of the two accumulator modules can be properly sized, within certain limits, coordinating it with the line voltage, but, whereas the battery module will have a voltage that is not very variable during the charging and discharging step, the supercapacitor module will be subjected to a wide voltage variation, for example a 50% variation, during the charging and discharging steps. Furthermore, FIG. 7 shows a power density-energy density diagram of the performances of some supercapacitors and batteries that are currently available in the market. For example the power is considered as delivered/absorbed by weight unit and the energy is considered as stored/released by weight unit.

According to the present invention, in order to minimize the weight, the space taken up and the cost of the power supply and energy harvesting system, the first accumulator module must deliver a high power density and enable a large number of cycles in its working life, accepting its low energy density. On the contrary, the second accumulator module must deliver a high energy density (greater than the energy density provided by the first accumulator module), accepting its small power density (namely, smaller than the power density provided by the first accumulator module) and the ability to bear a small number of charging/discharging cycles in its working life (namely, smaller than the number of charging/discharging cycles that can be borne by the first accumulator module).

The invention claimed is:

1. An auxiliary energy management system (1) of at least one drive chain (10; 30, 32) of an electric vehicle (100), comprising:
a power supply terminal (25), which can be electrically coupled to a network power supply line (12) supplying a network supply power voltage ($V_{AL}$), and said drive chain (10; 30, 32);
an auxiliary power supply assembly (3), which can be electrically coupled to the power supply terminal (25), including a first accumulator assembly (2) configured to generate a first auxiliary power supply voltage having a first value, and a second accumulator assembly (4) configured to generate a second auxiliary power supply voltage having a second value;
a switch (16) coupled between the auxiliary power supply assembly (3) and the power supply terminal (25); and
a control unit (102, 19), operatively coupled to said switch (16), and adapted to control the switch (16) to electrically couple said first accumulator assembly (2) or, alternatively, said second accumulator assembly (4) to said power terminal (25) implementing respective operating conditions of the electric vehicle, comprising:
(i) a first operating condition of supplying the drive chain by means of a first intermediate voltage correlated, at least in part, to the first auxiliary power supply voltage;
(ii) a second operating condition of charging the second accumulator assembly (4) by means of a second intermediate voltage correlated to the network power supply voltage ($V_{AL}$);
(iii) a third operating condition of supplying the drive chain (10; 30, 32) by means of a third intermediate power supply voltage correlated to the second auxiliary power supply voltage; and
(iv) a fourth operating condition of charging the first accumulator assembly (2) by means of a fourth intermediate voltage correlated to a recovered voltage generated by the drive chain (10; 30, 32) operating as electric generator.

2. A system according to claim 1, wherein:
the first operating condition is an acceleration of said electric vehicle and includes supplying the drive chain (10; 30, 32) with a portion of power from the network power supply line (12) and a further portion of power from the first accumulator assembly (2), thus generating the first intermediate voltage;
the second operating condition is a parking or running at substantially constant speed of said electric vehicle and includes charging the second accumulator assembly (4) by means of the second intermediate voltage whose value is chosen according to the power with which it is intended to charge the second accumulator assembly;
the third operating condition is an absence of said primary power supply voltage ($V_{AL}$), and includes supplying the drive chain (10; 30, 32) by means of the third intermediate voltage whose value is chosen according to the operative voltage required by the drive chain (10; 30, 32); and
the fourth operating condition is a braking of said electric vehicle and includes charging the first accumulator assembly (2) by means of the fourth intermediate voltage which derives from the recovered voltage, and whose value is chosen according to the power with which it is intended to charge the first accumulator assembly (2).

3. A system according to claim 1, further comprising a single bidirectional DC-DC converter (18) operatively arranged between the switch (16) and the power supply terminal (25), configured to form an interface shared at alternate times for the adaptation of the voltage levels between the auxiliary power supply assembly (3) and the drive chain (10; 30, 32), and vice versa, and between the network power supply line (12) and the auxiliary power supply assembly (3), wherein:
during the first operating condition, the switch (16) is controlled so as to electrically couple the first accumulator assembly (2) to the DC-DC converter (18), and the DC-DC converter (18) is controlled so as to boost or buck the first auxiliary power supply voltage as a function of the voltage level accepted by the drive chain (10; 30, 32), thus delivering a power that supplies the drive chain at the first intermediate voltage, together with the network power supply voltage ($V_{AL}$);
during the second operating condition, the switch (16) is controlled so as to electrically couple the second accumulator assembly (4) to the DC-DC converter (18), and the DC-DC converter (18) is controlled so as to boost or buck the network power supply voltage ($V_{AL}$) as a function of the voltage level accepted by the second accumulator assembly (4), so that the power supply line (12), in addition or as an alternative to supplying the load (10), delivers a power that charges the second accumulator assembly (4) at the second intermediate voltage (4);
during the third operating condition, the switch (16) is controlled so as to electrically couple the second accumulator assembly (4) to the DC-DC converter (18), and the DC-DC converter (18) is controlled so as to boost or buck the second auxiliary power supply voltage as a function of the voltage level accepted by the drive chain (10; 30, 32), thus delivering a power that supplies the drive chain at the third intermediate voltage; and
during the fourth operating condition, the switch (16) is controlled so as to electrically couple the first accumulator assembly (2) to the DC-DC converter (18), and the DC-DC converter (18) is controlled so as to boost or buck the recovered voltage as a function of the voltage level accepted by the first accumulator assembly (2), so that the load (10), operated as a generator during the braking, in addition or as an alternative to the power supply line (12), delivers a power that charges the first accumulator assembly (2).

4. A system according to claim 2, wherein the DC-DC converter (18) is further configured for:
operating, during the first operating condition, in voltage boost mode to transfer energy from the first accumulator assembly (2) to the drive chain (10; 30, 32);
operating, during the second operating condition, in voltage buck mode to transfer energy from the drive chain (10; 30, 32) to the first accumulator assembly (2);
operating, during the third operating condition, in voltage buck mode to transfer energy from the power supply network (12) to the second accumulator assembly (4); and
operating, during the fourth operating condition, in voltage boost mode to transfer energy from the second accumulator assembly (4) to the drive chain.

5. A system according to any one of the preceding claim 1, further comprising a network power supply switch (22)

configured to electrically couple and uncouple the power supply terminal (25) to and from the network power supply line (12), said network power switch (22) being open during said operating condition during said operating condition of absence of said primary power supply voltage ($V_{AL}$).

6. A system according to claim 1, wherein the first accumulator assembly (2) is adapted to deliver a first power density and a first energy density, and the second accumulator assembly (4) is adapted to deliver a second power density lower than the first power density and a second energy density higher than the first energy density, and wherein the second accumulator assembly (4) is adapted to support a number of charging/discharging cycles during its working life which is lower than the number of charging/discharging cycles that the first accumulator assembly (2) is adapted to support during its working life.

7. A system according to claim 1, wherein the first accumulator assembly (2) comprises an array of supercapacitors (2).

8. A system according to claim 1, wherein the second accumulator assembly (4) comprises a battery stack (4) including a plurality of batteries chosen from: lithium batteries, lead batteries, NiMH batteries, NiCd batteries, ZEBRA batteries.

9. An electric vehicle (100) comprising:
an electric motor (32), electrically coupled to the network power supply line (12) through a traction converter (30),
a traction system of the electric vehicle (100), operatively coupled to said electric motor (32) to control said electric vehicle (100) in acceleration, braking, parking and running at substantially constant speed;
an auxiliary energy management system (1) according to claim 1, operatively coupled to said electric motor (32); and
a control unit (102, 19), operatively connected to the auxiliary energy management system (1) to control the operation of said auxiliary energy management system (1) during the first, second, third and fourth operating conditions.

10. An auxiliary energy management method of at least one drive chain (10; 30, 32) of an electric vehicle (100), comprising the steps of:
supplying a network power supply voltage ($V_{AL}$) at a power supply terminal (25);
generating a first auxiliary power supply voltage, having a first value, by means of a first accumulator assembly (2);
generating a second auxiliary power supply voltage, having a second value, by means of a second accumulator assembly (4);
electrically coupling said first accumulator assembly (2) or, alternatively, said second accumulator assembly (4), to said second power supply terminal (25) to implement respective operating conditions of the electric vehicle, comprising:
(i) a first operating condition of supplying the drive chain by means of a first intermediate voltage correlated, at least in part, to the first auxiliary power supply voltage;
(ii) a second operating condition of charging the second accumulator assembly (4) by means of a second intermediate voltage correlated to the network power supply voltage ($V_{AL}$);
(iii) a third operating condition of supplying the drive chain (10; 30, 32) by means of a third intermediate power supply voltage correlated to the second auxiliary power supply voltage; and
(iv) a fourth operating condition of charging the first accumulator assembly (2) by means of a fourth intermediate voltage correlated to a recovered voltage generated by the drive chain (10; 30, 32) operating as electric generator.

11. A method according to claim 10, wherein:
the first operating condition is an acceleration of said electric vehicle and includes supplying the drive chain (10; 30, 32) by drawing a portion of power from the network power supply line (12) and a further portion of power from the first accumulator assembly (2), thus generating the first intermediate voltage;
the second operating condition is a parking or running at substantially constant speed of said electric vehicle and includes charging the second accumulator assembly (4) by means of the second intermediate voltage whose value is chosen according to the power with which it is intended to charge the second accumulator assembly;
the third operating condition is an absence of said primary power supply voltage ($V_{AL}$), and includes supplying the drive chain (10; 30, 32) by means of the third intermediate voltage whose value is chosen according to the operative voltage required by the drive chain (10; 30, 32); and
the fourth operating condition is a braking of said electric vehicle and includes charging the first accumulator assembly (2) by means of the fourth intermediate voltage which derives from the recovered voltage, and is chosen according to the power with which it is intended to charge the first accumulator assembly.

12. A method according to claim 10, further comprising the steps of:
generating, during the first operating condition, the first intermediate voltage by boosting or bucking the first auxiliary power supply voltage as a function of the voltage level accepted by the drive chain (10; 30, 32);
generating, during the second operating condition, the second intermediate voltage by boosting or bucking the network power supply voltage ($V_{AL}$) as a function of the voltage level accepted by the second accumulator assembly (4);
generating, during the third operating condition, the third intermediate voltage by boosting or bucking the second auxiliary power supply voltage as a function of the voltage level accepted by the drive chain (10; 30, 32); and
generating, during the fourth operating condition, the fourth intermediate voltage by boosting or bucking the recovered voltage as a function of the voltage level accepted by the first accumulator assembly (2).

13. A method according to claim 11 or 12, further comprising the steps of:
operating, during the first operating condition, in voltage boost mode to transfer energy from the first accumulator assembly (2) to the drive chain (10; 30, 32);
operating, during the second operating condition, in voltage buck mode to transfer energy from the drive chain to the first accumulator assembly (2);
operating, during the third operating condition, in voltage buck mode to transfer energy from the power supply network (12) to the second accumulator assembly (4); and operating, during the fourth operating condition, in voltage boost mode to transfer energy from the second accumulator assembly (4) to the drive chain.

14. A method according to claim 10, further comprising:
delivering, by means of the first accumulator assembly (2) a first power density and a first energy density; and
delivering, by means of the second accumulator assembly (4), a second power density lower than the first power density and a second energy density higher than the first energy density.

* * * * *